(No Model.) 4 Sheets—Sheet 1.

J. W. CULMER.
GAS METER.

No. 429,423. Patented June 3, 1890.

WITNESSES:
Will T. Norton
Howell Bartle

INVENTOR
John Woodruff Culmer
BY
Johnson & Johnson
his ATTORNEYS.

(No Model.)

J. W. CULMER.
GAS METER.

No. 429,423.

4 Sheets—Sheet 2.

Patented June 3, 1890.

WITNESSES:

INVENTOR

BY his ATTORNEYS.

(No Model.) 4 Sheets—Sheet 3.

J. W. CULMER.
GAS METER.

No. 429,423. Patented June 3, 1890.

WITNESSES:
Wm. F. Norton
Howell Bartle.

INVENTOR
John Woodruff Culmer
BY
Johnson & Johnson
his ATTORNEYS.

(No Model.)  4 Sheets—Sheet 4.

J. W. CULMER.
GAS METER.

No. 429,423.  Patented June 3, 1890.

WITNESSES:  INVENTOR

UNITED STATES PATENT OFFICE.

JOHN W. CULMER, OF NEW BRIGHTON, PENNSYLVANIA.

GAS-METER.

SPECIFICATION forming part of Letters Patent No. 429,423, dated June 3, 1890.

Application filed December 18, 1889. Serial No. 334,181. (No model.)

*To all whom it may concern:*

Be it known that I, JOHN W. CULMER, a citizen of the United States, residing at New Brighton, in the county of Beaver and State of Pennsylvania, have invented new and useful Improvements in Gas-Meters, of which the following is a specification.

My invention relates to that class of meters known as "dry meters," and especially to that type in which a bellows attached to a central ring, in combination with that ring and collapsible chamber for gas and with the inclosing-case for said bellows, forms a second chamber, to which gas is admitted and from which it is expelled by the expansion and collapse of the said bellows, the chambers being complementary each to the other, in that the admission of gas into one expels the gas from the other, and vice versa. Heretofore meters of this type have been constructed upon the following general lines: An actuating mechanism has been constructed and erected within the central ring and connected with disks forming the sides of the bellows. Such mechanism has been connected with a valve system through the medium of a series of crank-levers and a connecting-rod, and has provision for reversing such valve system at the inner and outer extremities of each stroke of the bellows.

To construct a mechanism which shall at once form an equalizing system for attachment to the two bellows-disks, an actuating system for the operation of the valve, and an actuating system for the operation of a registering device; to construct such mechanism of the least number of elements and to make such elements, as far as possible, interchangeable; to erect and connect such mechanism in such a way that the connecting pivots or pins of the swinging parts shall be to a great extent vertical in their positions and the wear be distributed over the flat bearing-surfaces of the various elements; to construct a valve system which shall be simple and of few parts, and to provide such valve system with a means of adjustment which shall be easily operated and permanent after operation, are the objects of my invention.

Figure 1:
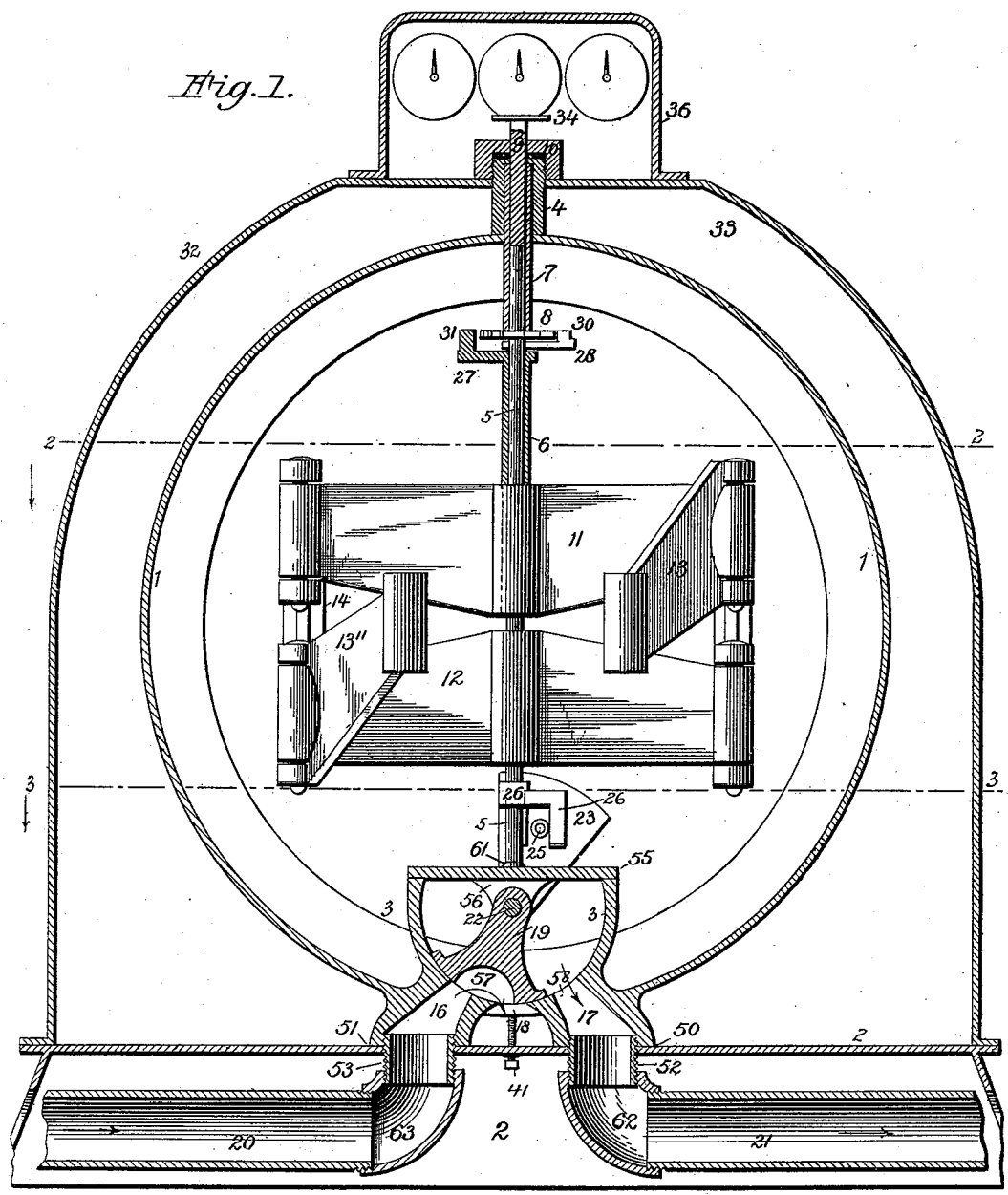
Figure 2:
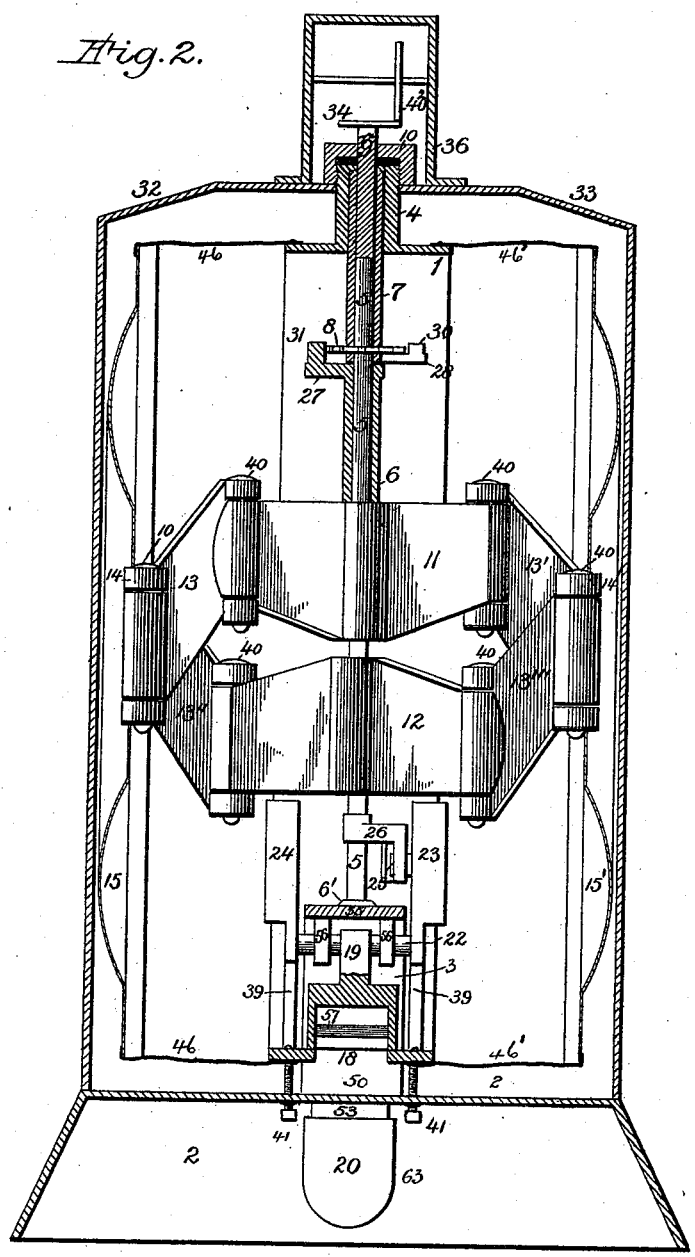
Figure 3:
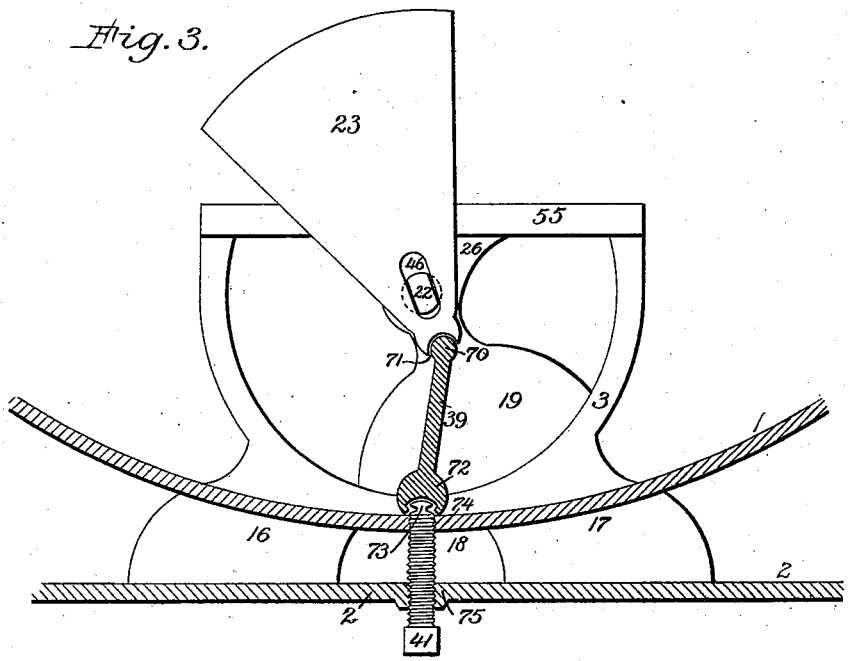
Figure 4:
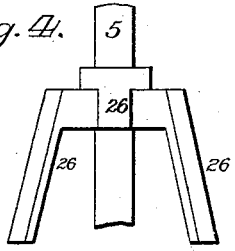
Figure 5:
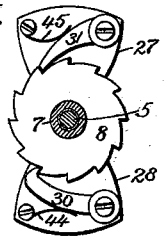
Figure 6:
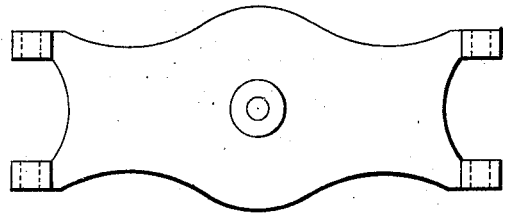
Figure 7:
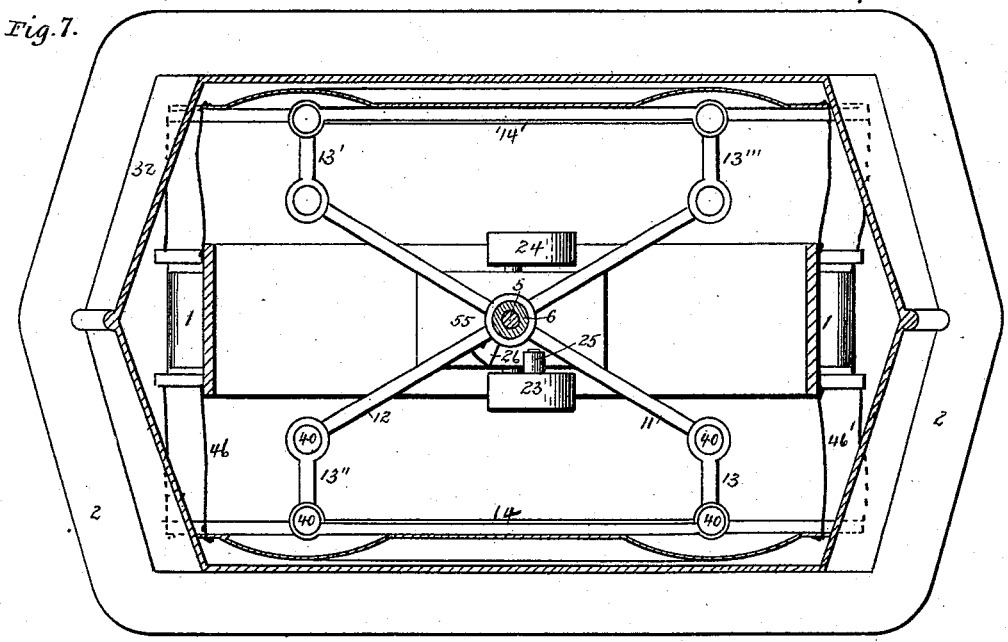
Figure 8:
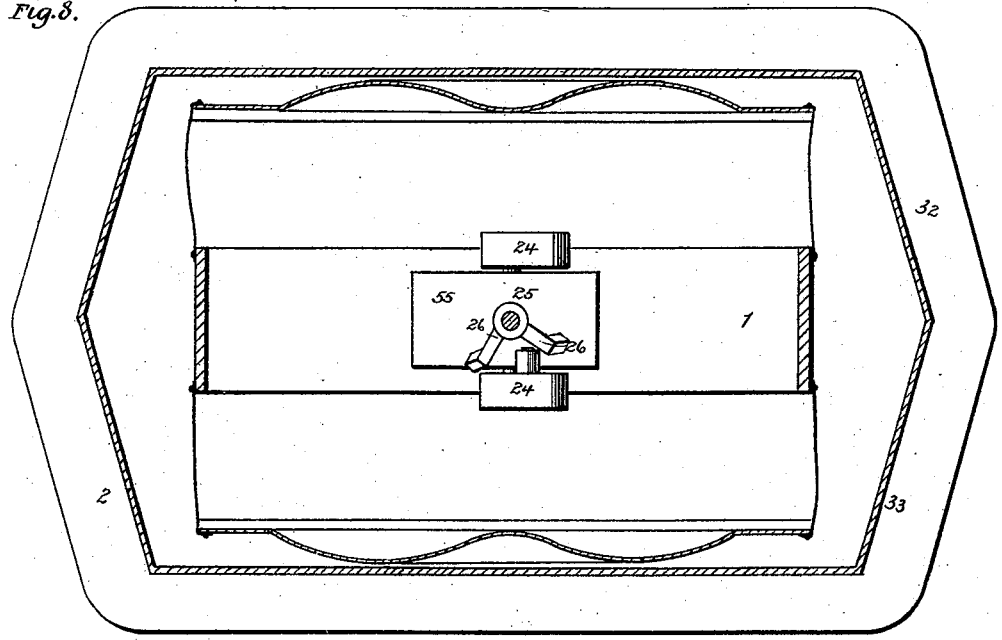

In the accompanying drawings, Figure 1 is a vertical longitudinal section of a meter embodying my invention. Fig. 2 is a transverse vertical section of the same. Fig. 3 is a detached view of the valve-connections and adjusting devices. Fig. 4 is a detached view of a rotating forked lever for operating the valve. Fig. 5 is a detached view of the mechanism attached to the actuating device for the operation of the register. Fig. 6 is a detached view of one of the spiders by which the bellows-disks are connected to the valve-actuating mechanism. Fig. 7 represents a horizontal section taken on the line 2 2 of Fig. 1, and Fig. 8 a horizontal section taken on the line 3 3 of Fig. 1.

I construct of any approved material, preferably of cast-iron, the ring 1, upon the lower portion of which is affixed a valve-casing 3, of semicircular cross-section, within the periphery of said ring, having the inlet and the outlet passages 16 and 17 passing through nipple projections of said ring. The faces 50 51 of these nipples are faced off, so that when placed upon the base 2 the ring 1 shall maintain a vertical position. The inner surfaces of these hollow projections are threaded for the reception of the nipples 52 53.

I construct the passages 16 17 of such a form that their inner extremities shall form the elongated narrow ports 57 58 within the valve-casing 3, and I further construct centrally between the ports 57 58 the bottom port 18, opening from the interior of the valve-casing 3 into the space between the passages 16 17, and communicating with the chamber of the outer case. At a point upon the exterior top of the said ring diametrically opposite to the port 18, I construct the stud 4, and bore it out upon a diametrical line extending through the center of the port 18 for the admission of the tube 7, and to secure the ring at its top to the inclosing-case. The valve-case is covered by the cap 55, having a step in or on the center of its upper surface for the reception of the rod 5, which extends up into the said tube 7, the said cap having the brackets 56 attached to its under surface for the reception of the rocking valve-shaft 22. The valve-casing 3 is open at its ends, so as to communicate with the central chamber. The ring 1 is mounted upon the base 2, which is of like material, and I make it fast thereon by means of the nipples 52 53 and the elbows 62 63, which are screwed upon said nipples from the lower side of the top of the base 2. The pipes 20 21 are screwed into the elbows 62 63, and extend to the exterior of the base for connection to the inlet and outlet pipes of the gas-service.

The swinging levers 11 12 are bored out in their centers for the reception in the lever 11 of the tube 6 and in the lever 12 to receive the rod 5. Through the centers of their extreme forked ends I bore them out in a line parallel with the line of the boring already made for the free admission of their connecting pins or pivots 40 40, which unite them to equalizing-levers. I make fast the vertical rod 5 within the swinging lever 12, and in like manner make fast the tube 6 within the swinging lever 11, and I secure upon the rod 5, near its lower extremity, the forked oscillating lever 26, which extends outward at right angles to the rod 5 to a point nearly in contact with the weighted lever 23, at which point the two arms of the fork are turned down at a right angle to their hub and stand flaring, so that the distance separating them at their lower extremities is greater than that separating them at the point at which they are turned downward. The rod 5 passes through the tube 6, and has, at a point just above the top of the latter, the horizontal plate 28, while the upper end of the said tube has the horizontal plate 27, the upper face of which plate 27 has the pawl 31, held engaged by the spring 45, while upon the plate 28, I attach the retracting-pawl 30, which is held in engagement by means of the spring 44, as in Fig. 5. A ratchet-wheel 8 is attached to the lower end of the tube 7, and I close the upper end of said tube by means of the rod 9, which is fixed thereto, and is extended upward and has made fast to its end the wheel 34, which is to be placed in mesh with the primary wheel of a registering device. The rod 5 is fitted at its lower end into the step 61, and its upper end is passed within the tube 7 above the ratchet-wheel 8. The cap 10 is screwed down upon the upper end of the plug 4 and suitably packed to lock said plug to the outer casing. The equalizing-levers 13 13' are attached to the swinging lever 11 by means of the pins 40 40, while the equalizing-levers 13'' 13''' are attached to the swinging lever 12 by means of similar pins 40 40, and the spider 14, Fig. 7, is attached to the equalizing-levers 13 13'' by means of like vertical pins, and in a like manner the spider 14' is attached to the equalizing-levers 13' 13'''. It will be seen that all four equalizing-levers are alike, and that the bringing of the mechanism into line is effected by the standing upward of the outer extremities of said levers when attached to the swinging lever 12, as in Fig. 2, and by the standing downward of the outer ends of said levers when attached to swinging lever 11, or vice versa. The disks of the bellows 15 15' are made fast to the spiders 14 14', and the latter connect with the swinging levers by the equalizing-levers. It will be seen that the expansion or outward movement of said disks rotates the rod 5 in one direction and the tube 6 in the opposite direction. It will be seen, further, that by means of the pawl 31, engaged with the ratchet 8, said ratchet is moved forward during that part of the stroke, and that by means of the retracting-pawl 30 that forward motion of the ratchet 8 is continued during the return motion of the mechanism. It will be plain that should the meter be operated backward the registration would go on precisely as though the operation were the regular one.

The valve is suitably fitted and mounted to have an oscillating movement in relation to the inlet and outlet passages 16 and 17. I prefer to construct this valve with such a lap as shall almost close the inlet-port toward the end of the stroke before the moment of complete reversal, and I fit the valve 19 to its shaft 22, so that it shall move positively with said shaft, which is passed through the valve between the brackets 56. The outer ends of the valve-shaft are formed with flat or squared faces to enter into slots 46 in the weighted levers 23 24, as in Fig. 3. I construct such weighted levers in pairs, having their upper portions extended and heavy, as shown, and I fit upon the inner face of the upper portion of one of such levers the roller-stud 25 to engage with or form a strike for the forked lever 36. At or near the lower end of the weighted levers 23 24 the slot 46 is formed, which fits easily upon the flat or squared ends of the shaft 22, and provides for a radial movement of such lever from the said central shaft 22. The extreme lower point of the weighted levers 23 24 are formed with the recess 71 for the reception of the upper globular end 70 of the toggle-arm 39. This toggle-arm 39 has its lower end enlarged and has formed therein a recess 72 for the reception of the point of an adjusting-screw 41, which I fit in threaded openings 75 in the base 2 and in threaded openings 74 in the ring 1.

The inclosing-case consists of two interchangeable halves 32 33, which I construct of any approved material, cast-iron or stamped sheet metal being preferable. This case has its top flattened at its central portion for the reception of the register-case 36. I erect upon and within the ring the hereinbefore-described devices and attach the disks 15 15' to the spiders 14 14' by means of screws or bolts. I attach the leather 46 46' to the edges of the ring and to the bellows-disks and place the two halves 32 33 of the case upon the base 2 and make them fast thereto by any approved method, and I make the central line at which said halves join tight and fast in like manner. I screw the cap 10 upon the stud 4 and place over it the register-case 36, inclosing a registering device, the primary wheel $40^2$ of which is placed in mesh with the wheel 34 on the rod 9. I make fast the joint or point of attachment between said register-case 36 and the case 32 33 and the device is ready for proof and adjustment. Gas being admitted through the inlet-pipe 20 and passage 16 flows beneath the valve 19 through the central port 18 and passes into the chamber of the surrounding case, and thereby forces the bellows inward by the outside pressure, and the swinging levers 11 12 are, through the medium of the connecting-levers 13 13' 13'' 13''', thereby given a rotating movement upon their common center. This movement of the swinging lever 12 turns the rod 5 and causes the lever 26 to engage with the roller-stud 25 on the weighted lever 23, and carries such weighted lever through the arc described by the rotation of the forked lever 26. In this movement the valve 19 is carried by means of the flat ends of the shaft 22 within the slot 46 of the weighted lever 23, and in such motion gradually reduces the opening of the port 16. The contents of the inner chamber are expelled through the port 58 and passage 17 by the pressure outside the chamber collapsing the bellows. The rotation of the forked lever having continued until the weighted levers are carried beyond their centers of gravity, they fall by gravity, the valve is reversed in its relation to the ports, and the gas from the supply passes into the inner chamber, and that contained in the outer chamber is expelled in turn. This operation goes on continuously. Should the volume of gas expelled during one complete stroke of the bellows be too great, the adjusting-screws 41 are set up from below the base. This action raises the toggle-arms 39 and with them the weighted levers, and by this means the roller-stud 25 is brought up higher within and between the arms of the fork-lever 26, and as said fork-lever 26 is narrowed at its upper portion, it will be seen that the weighted levers are actuated through a smaller arc of rotation of the fork-lever 26, and consequently through a smaller or shorter stroke of the bellows, expelling a lesser volume of gas. The screwing down or lowering of the adjusting-screws reverses this order of things, and by increasing the stroke of the bellows enlarges the volume of gas expelled. This form of construction also enables me to obtain a very quick throw or reversal of the valve, as the weighted lever 23 is brought up to a perpendicular line by the rotative action of the mechanism. The toggle-arm 39, resting upon its screw 41, is in a vertical line with said weighted arm, and a very slight motion beyond that perpendicular line will be multiplied by the reverse motion of the toggle-arm 39, and so rendered quick and effective. The opposite rotating movement of the swinging levers 11 12 moves the plates 27 and 28 through a similar arc, the pawls 30 31 upon these plates being engaged with the ratchet 8 of the registering system, and held so engaged by means of the springs 44 45. The rotating of the rod 5 and tube 6, to which these plates are fixed, moves the ratchet 8, with its connected register devices, continuously forward, the forward motion being effected in the one direction by the pawl 31 and in the other by the retracting-pawl 30.

While I prefer the type of valve herein shown and described, I do not confine myself to that form exclusively, but may substitute therefor any approved form of valve operated or actuated by the herein-described series of device.

While the foregoing description specifically sets out the construction illustrated in the drawings, yet it is obvious that changes may be made in the construction of the various parts without departing from the spirit of my invention or the scope of the claims; and it will be understood that the precise construction set out herein has been given because it is the preferred construction.

What I claim, and desire to secure by Letters Patent, is—

1. In a gas-meter, the combination, with an inclosing-case, of a central ring having at its lower side an open valve-casing 3, of semicircular form in cross-section, rising from its inner part, nipple-supports having the inlet and the exhaust passages 16 and 17, and the intermediate port 18, and an oscillating valve suspended within said casing for controlling said ports, substantially as described.

2. In a gas-meter, the inclosing-case and a central ring, the latter having an open valve-casing 3, of semicircular form in cross-section, rising from its lower inner part, nipple-supports forming the inlet and the outlet passages 16 and 17, and the intermediate bottom port 18, and having the external hollow top plug, in combination with a valve suspended to oscillate within said casing, a vertical rod 5, mounted upon said valve-casing and within the said external hollow plug, and means operated by the diaphragms for oscillating said valve, substantially as described.

3. In a gas-meter, the central ring formed with the interior open semicircular casing 3, the exterior nipples 50 51, provided with threaded passages 16 and 17, and the top hollow screw-plug 4, in combination with an oscillating valve suspended within said casing, the inclosing chamber forming case, the bottom screw-nipples 52, and the top screw-cap 10, whereby the ring is firmly secured to the casing, and the said nipples forming ports, and the said top plug forming a central bearing, substantially as described.

4. In a gas-meter, the combination, with a central ring attached to a base by means of inflow and outflow projections having passages opening outside of said base and interiorly as ports within the said ring, of a valve-seat of cylindrical section forming part of said ring, and a bracketed and stepped cover attached to said valve-seat and forming therewith a valve-chamber, as shown and described, and for the purpose set forth.

5. In a gas-meter, the combination, with an outer case, a base, a central ring attached to such base and provided with a hollow, a projection or stud extending beyond said case at its upper portion, and a valve-chamber diametrically opposite said hollow projection, of an adjusting-screw passing through said base and ring, a toggle-arm within said ring, and an automatically-operated valve, substantially as shown and described, and for the purpose set forth.

6. In a gas-meter, the combination, with a central ring having a top external projection or stud, and an internal bottom valve-case having inlet and outlet passages, and an oscillating valve, of a vertical rod having permanently fixed upon it a forked lever and a swinging lever, a tube surrounding a portion of such rod and having fixed to it a like swinging lever, equalizing links or levers connecting the outer ends of said swinging levers, the bellows, and their connecting-spiders, a step for the reception of the lower end of said rod, and a register-connected tube for the reception of the upper end of said rod, substantially as described, and for the purpose set forth.

7. In a gas-meter, the combination, with a rotating rod and tube 6, swinging levers 11 12, and the bellows of said meter, of a ratchet-wheel upon said tube, a central ring, a register-connecting tube 7, forming a guide for the rotating rod within said ring and extending through a fixed hollow projection to the outside of said ring, and pawls suitably attached to the said tube 6 and rod for actuating the said ratchet, substantially as described, and for the purpose set forth.

8. In a meter, the combination, with the semi-rotating rod and inclosing-tube 6 of an actuating mechanism, a plate made fast to one of these elements and bearing a pawl and spring, and a plate made fast to the other element and bearing a retracting pawl and spring, of a ratchet upon said rod engaging with said pawls and suitably connected with a registering device, as set forth.

9. In a gas-meter, the combination, with the central ring provided with suitable ports, a valve-seat, and an oscillating valve operating upon a central pivot-shaft within said seat, of weighted levers fitted upon the flat ends of or suitably connected with said pivot-shaft, toggle-arms meshing into suitable recesses in said weighted levers, adjusting-screws for said weighted levers, and a vertical rod provided with a forked rotating lever adapted to engage one of said weighted levers, substantially as and for the purpose set forth.

10. In a gas-meter, the combination, with an oscillating valve having a central pivot-shaft, a weighted lever adjustably mounted upon said pivot-shaft by a slotted connection, and a rotating forked lever of increasing space between said forks as they extend downward, of a toggle-arm meshed into the lower end of said weighted arm, a screw forming a support for the lower end of the said toggle-arm, means of adjustment in connection with the divergent arms of the forked lever, and the roller-stud of the weighted lever adapted to engage the said forked lever-arms, substantially as and for the purpose specified.

11. In a gas-meter, the combination of an outer casing formed with a base, an inner bellows-supporting ring within said casing and formed with hollow inlet and outlet projections which rest upon said base, and nipples screwed into said projections through said base and securing said projections to said base, substantially as described.

12. In a gas-meter, the combination of an outer casing formed with a base, an inner bellows-supporting ring within said casing and formed with hollow inlet and outlet projections which rest upon said base, nipples screwed through said base into said projections and securing the latter to the former, and a stud secured to said casing and said ring at a point diametrically opposite to said nipples, substantially as described.

13. In a gas-meter, the combination of an outer casing, an expansible and collapsible bellows-forming chamber within the same, and provided with a semi-cylindrical valve-seat in its bottom communicating with said bellows and formed with an inlet-port and an outlet-port, and with an intermediate port communicating with the chamber of the casing with a valve pivoted to oscillate in said seat, recessed to alternately connect two of said ports, and suitable bellows-operating mechanism connecting said valve to the expansible and collapsible walls of said chamber, substantially as described.

14. In a gas-meter, the combination of an outer casing, an expansible and collapsible bellows-forming chamber within said casing, a semi-cylindrical valve-seat in the bottom of said chamber, having open ends and formed with inlet and outlet ports and passages extending through said casing, and with a port between said ports communicating with the chamber of said casing, a valve pivoted centrally in said valve-seat and having its seating-face recessed to connect two of said ports, a weighted lever upon the pivot-shaft of said valve and formed with a stud upon its face, and a vertical rod connected to be partly reversed in opposite directions by the walls of the expansible and collapsible chamber, and provided with a laterally-projecting lever formed with bent forked arms engaging the stud of said weighted lever, substantially as described.

15. In a gas-meter, the combination of an outer casing, an inner expansible and collapsible bellows-forming chamber formed with an inlet and an outlet and with an intermediate port communicating with the interior of said outer casing, a valve constructed to alternately connect said inlet and outlet with said intermediate port, a vertically-journaled rod provided with an arm for shifting said valve and with an arm carrying a spring-pawl, a sleeve upon said shaft and provided with an arm carrying a spring-pawl, a ratchet-wheel engaged by said pawl, a registering mechanism connected to be operated by said ratchet-wheel, and swinging and equalizing levers connected to the collapsible and expansible walls of said chamber and to said rod and sleeve to partly and alternately revolve the same in opposite directions, substantially as described.

16. In a gas-meter, the combination, with an outer casing and an inner collapsible and expansible bellows-forming chamber formed with a valve-casing having an inlet-port and an outlet-port and a port between said ports communicating with said outer casing, of a valve having its pivotal shaft formed with flat ends and journaled in said valve-casing and adapted to alternately connect two of said ports, two weighted levers provided with longitudinal slots to fit and slide upon the flattened ends of said valve-shaft and formed with rounded recesses in their lower ends, a vertical rod connected to the collapsible and expansible walls of said inner chamber to be partly revolved in alternate opposite directions, and provided with an arm having downwardly-bent diverging and forked ends, a stud upon one of said weighted levers and engaged by said forked ends, toggle-arms having rounded upper ends fitting into the recesses of said weighted levers and having rounded recesses in their lower ends, and set-screws inserted through the walls of said outer casing and inner chamber and fitted into the recesses of said arms with their upper rounded ends, substantially as described.

17. In a gas-meter, the combination, with the outer casing, the inner expansible and collapsible chamber having inlet and outlet ports and an intermediate port communicating with said outer casing, a valve for alternately connecting said intermediate port with the inlet and outlet ports, and a registering mechanism having its operating-shaft extended into said outer casing and inner chamber, of a rod connected to shift said valve and provided with a plate having a spring-pawl, a sleeve upon said rod and provided with a plate having a spring-pawl, swinging levers connected to the expansible and collapsible walls of said inner chamber and to said rod and sleeve for partly and alternately revolving them in opposite directions, and a ratchet-wheel engaging said pawls and connecting the register device with said rod, substantially as described.

18. In a gas-meter, the combination, with an outer casing, an inner expansible and collapsible bellows-forming chamber having laterally-movable walls, and inlet and outlet ports and an intermediate port communicating with said outer casing, a valve for alternately connecting two of said ports, a register, and a valve-operating rod and a sleeve upon the same, both connected to operate said register, of two swinging levers, respectively secured at their middles upon said rod and sleeve, two spiders secured to the laterally-movable walls of said inner chamber, and two pairs of equalizing-levers pivoted to the ends of said spiders and to the opposite ends of said swinging levers, substantially as described.

19. In a gas-meter, a bellows-containing ring having a foot-support and a top support, and a fixed casing to which these supports are secured, a valve-case having inlet and outlet passages passing through said foot-support, a register-operating connection passing through said top support, and an oscillating valve within said case, in combination with a vertical rod mounted in bearings upon said valve-case and within said top-ring support, and suitable mechanism mounted upon said rod for connecting the bellows to the valve and to the registering device, substantially as described.

20. The combination, with the bellows of a gas-meter, of an oscillating valve for controlling the inlet and outlet ports and having weighted levers attached to its shaft, a rotatable forked lever having downward flaring arms engaging with one of said weighted levers, means for adjusting said weighted levers in relation to their engagement with said flaring arms, and means for connecting said forked lever with the moving sides of the bellows, substantially as described.

21. The combination, in a gas-meter, of a case having inlet and outlet ports and a valve-case communicating therewith, an oscillating valve adapted to control said ports and suitable mechanism for connecting said valve with said bellows, a weighted lever adapted to have a longitudinal movement upon the shaft of said valve, an adjusting-screw fixed in said case, and an arm having its ends seated upon and having a free rocking connection with the end of said weighted lever and the end of said screw, substantially as described, for the purpose stated.

In testimony whereof I have hereunto set my hand in the presence of two subscribing witnesses.

JNO. W. CULMER.

Witnesses:
A. E. H. JOHNSON,
E. M. DAWSON.